US 6,736,438 B1

(12) United States Patent
Wieclawski

(10) Patent No.: US 6,736,438 B1
(45) Date of Patent: May 18, 2004

(54) SEMI-PASSIVE LATCH SYSTEM FOR A VEHICLE COMPONENT

(75) Inventor: Stanislaw Andrzej Wieclawski, Riedstadt (DE)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/447,026

(22) Filed: May 28, 2003

(51) Int. Cl.⁷ ............................... B60R 7/04; B60P 3/00
(52) U.S. Cl. ................. 296/24.3; 296/37.8; 224/275; 292/95; 292/DIG. 66
(58) Field of Search ......................... 296/37.8, 24.3, 296/24.33, 24.34, 24.39, 24.4, 24.44, 24.46; 297/253, 216.1; 224/275, 539, 500; 292/95, 108, 121, 129, DIG. 61

(56) References Cited

U.S. PATENT DOCUMENTS

| | | | | |
|---|---|---|---|---|
| 5,106,143 A | * | 4/1992 | Soeters | 296/37.8 |
| 5,338,081 A | * | 8/1994 | Youing et al. | 296/37.8 |
| 5,669,537 A | * | 9/1997 | Saleem et al. | 296/37.1 |
| 5,687,895 A | * | 11/1997 | Allison et al. | 296/37.6 |
| 6,116,674 A | * | 9/2000 | Allison et al. | 296/37.8 |
| 6,135,529 A | * | 10/2000 | De Angelis et al. | 296/37.8 |
| 6,139,080 A | * | 10/2000 | Saffold | 296/37.6 |
| 6,513,873 B2 | | 2/2003 | Tsuda et al. | |
| 2002/0011505 A1 | * | 1/2002 | Cole et al. | 224/275 |

* cited by examiner

*Primary Examiner*—D. Glenn Dayoan
*Assistant Examiner*—H. Gutman
(74) *Attorney, Agent, or Firm*—Bill C. Panagos

(57) ABSTRACT

A latch assembly is provided for securing an auxiliary vehicle component to an anchoring member mounted on the vehicle. The latch assembly includes a housing operatively connected to the vehicle component, and a hook member movably mounted relative to the housing. The hook member includes a hook portion for engaging the anchoring member to secure the vehicle component relative to the anchoring member. The hook member is movable between a first and a second position. The hook member is permitted to move to an unlatched position to disengage the anchoring member while the hook member is in the first position. The hook member is prevented from moving to the unlatched position while in the second position.

19 Claims, 5 Drawing Sheets

SEMI-PASSIVE LATCH SYSTEM FOR A VEHICLE COMPONENT

BACKGROUND OF THE INVENTION

The present invention relates to a latching assembly for a vehicle component and more particularly to a latching assembly operative to lock and unlock a vehicle component and retain the vehicle component to the vehicle during normal usage conditions and crash situations.

It is known to releasably attach a child seat to anchoring members, such as ISO-FIX latches or other loop members, which are anchored to a portion of a vehicle, such as the vehicle frame or floor. The anchoring members typically extend into the passenger compartment between the seatback and seat cushion. The child seats are attached to the anchoring members to secure the child seat within the passenger compartment during operation of the vehicle.

A latch is used to attach the child seat to the anchoring members. The latches are manually operated to release the child seat from the anchoring members. These latches perform adequately during normal operation of the vehicle. During a rapid deceleration of the vehicle, such as an emergency stop or crash situation, it is important to prevent the latch from unlatching. During a sudden deceleration of the vehicle, the child seat is forced toward the front of the vehicle. The inertia of the vehicle component applies force on the latch and anchoring member. It is important that the latch not deform and that the child seat not be released from the anchoring member. It would be desirable to develop a latch for retaining a child seat or other vehicle component to anchoring members of a vehicle that is economical, simple to operate, and can perform during rapid deceleration of the vehicle.

SUMMARY OF THE INVENTION

This invention relates to a latch assembly for securing an auxiliary vehicle component to an anchoring member mounted on the vehicle. The latch assembly includes a housing operatively connected to the vehicle component, and a hook member removably mounted relative to the housing. The hook member includes a hook portion for engaging the anchoring member to secure the vehicle component relative to the anchoring member. The hook member is movable between a first and a second position. The hook member is permitted to move to an unlatched position to disengage the anchoring member while the hook member is in the first position. The hook member is prevented from moving to said unlatched position while in the second position.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
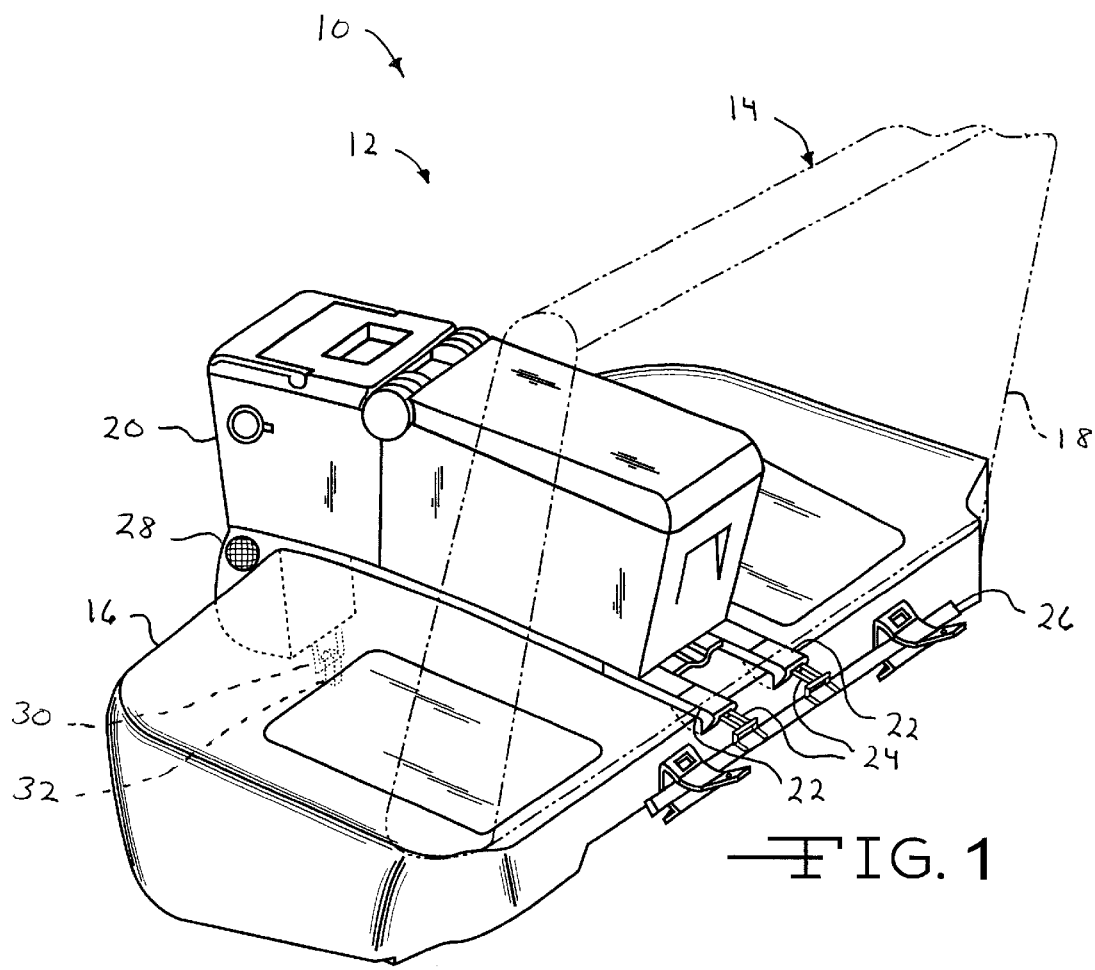
FIG. 1 is a perspective view of an occupant compartment of a motor vehicle is including an auxiliary vehicle component including a latch assembly, in accordance with the present invention.

Referring now to the drawings, there is illustrated in FIG. 1 a portion of a motor vehicle 10 having an occupant compartment 12 including a seat 14. The seat 14 includes a seat cushion 16 and a seatback 18 indicated by broken lines. An auxiliary vehicle component 20 is secured to the vehicle 10, in accordance with the present invention. The vehicle component 20 includes a pair of latch assemblies 22 for securing the vehicle component 20 to a respective pair of U-shaped anchoring wires 24. The anchoring wires 24 can be secured to the vehicle 10 by any suitable manner, such as by being secured to a portion 26 of the vehicle 10.

Figure 8:
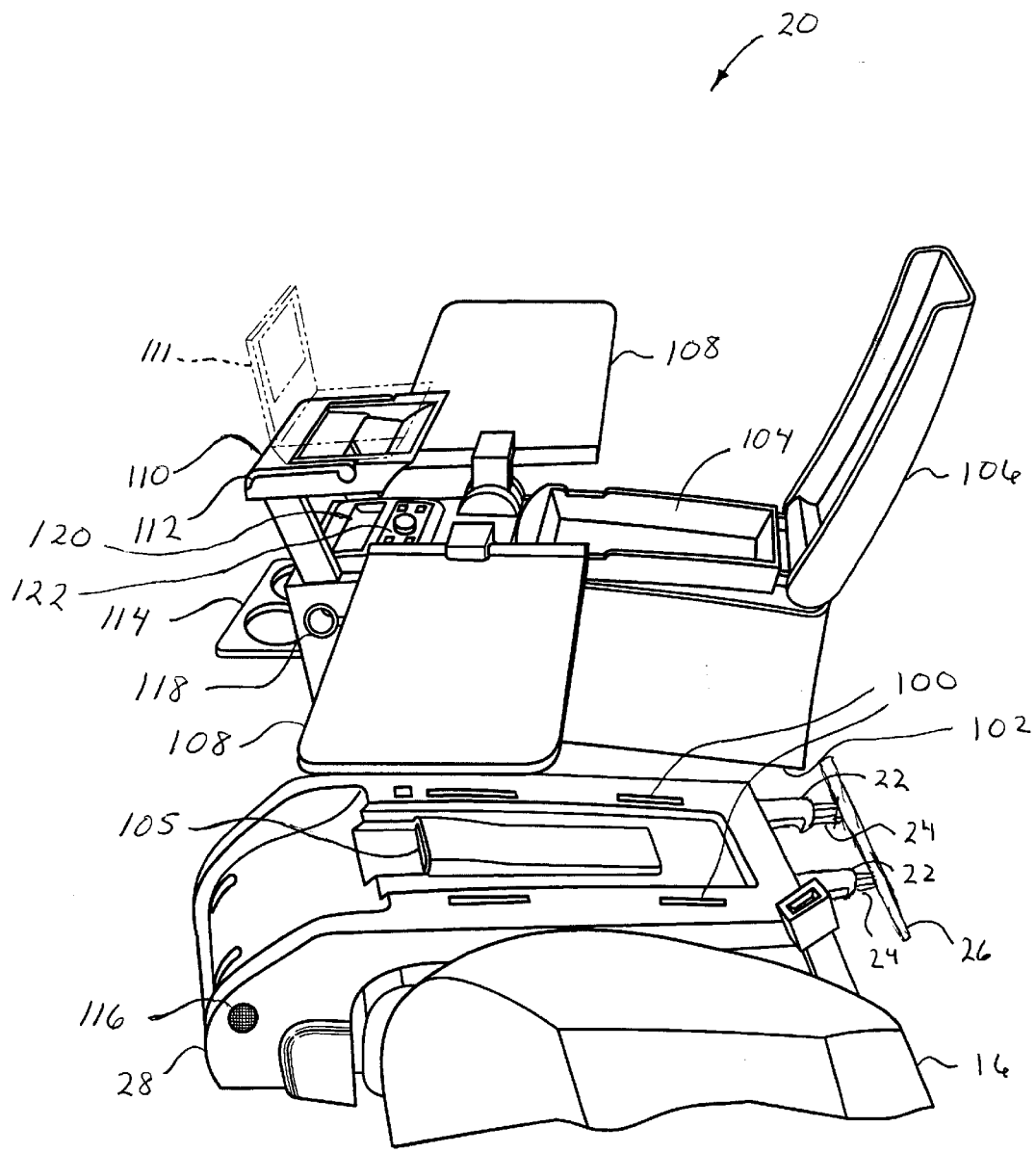
FIG. 8 is perspective view of the auxiliary vehicle component and latch assembly shown in FIG. 1.

The auxiliary vehicle component 20 may be any vehicle component that is desired to be restrained within the occupant compartment 12 of the vehicle 10. In a preferred embodiment, the vehicle component 20 is a travel assistant system, as shown in FIGS. 1 and 8, and described below. However, the vehicle component 20 may be any removable console, media center, or child seat. The auxiliary vehicle component 20 may rest on the seat cushion 16 and against the seatback 18.

The vehicle component 20 may include a separate mounting base or support portion 28 that may extend to the floor (not shown) of the vehicle 10 and may also extend between at least a portion of the vehicle component 20 and the seat cushion 16, although such is not required. The support portion 28 may rest against the floor and additionally, or alternatively, the seat cushion 16 of the vehicle 10. The support portion 28 may be separate from the vehicle component 20 or formed integral to the vehicle component 20. The support portion 28 may accommodate multiple, removable and interchangeable components similar to the vehicle component 20. The latch assemblies 22 may be secured directly to the support portion 28 or any portion of the vehicle component 20.

The vehicle component 20 may be further secured to the floor of the vehicle 10 by an optional latch 30. The latch 30 may be a hook member for connection to an optional loop member 32 that is secured to the vehicle 10. The latch 30 generally secures the front portion of the vehicle component 20 and also helps prevent the vehicle component 20 from freely pivoting about the anchoring wires 24.

As illustrated, the vehicle component 20 includes the pair of latch assemblies 22 for securing the vehicle component 20 to the respective pair of anchoring wires 24. However, it will be appreciated that any number of latch assemblies 22, including a single latch assembly 22, may be used to secure the vehicle component 20 to the vehicle 10. The anchoring wires 24 are generally U-shaped hooks, such as ISO-FIX anchors. It will be appreciated that the anchoring wires 24 may be any loop member that may be operably engaged by the latch assembly 22. The latch assemblies 22 engage the respective anchoring wires 24 in a manner that will be described below. The anchoring wires 24 are secured to or formed integral with the portion 26 of the vehicle 10. The portion 26 may be a cross member or side rail of the frame (not shown) of the vehicle 10 or any other member secured to the vehicle 10 or the frame thereof.

Figure 2:
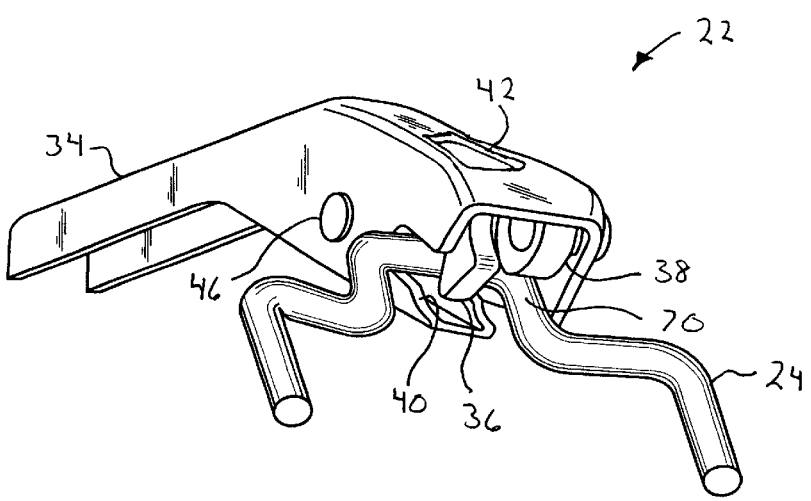
FIG. 2 is a perspective view of the latch assembly shown in FIG. 1.
Figure 3:
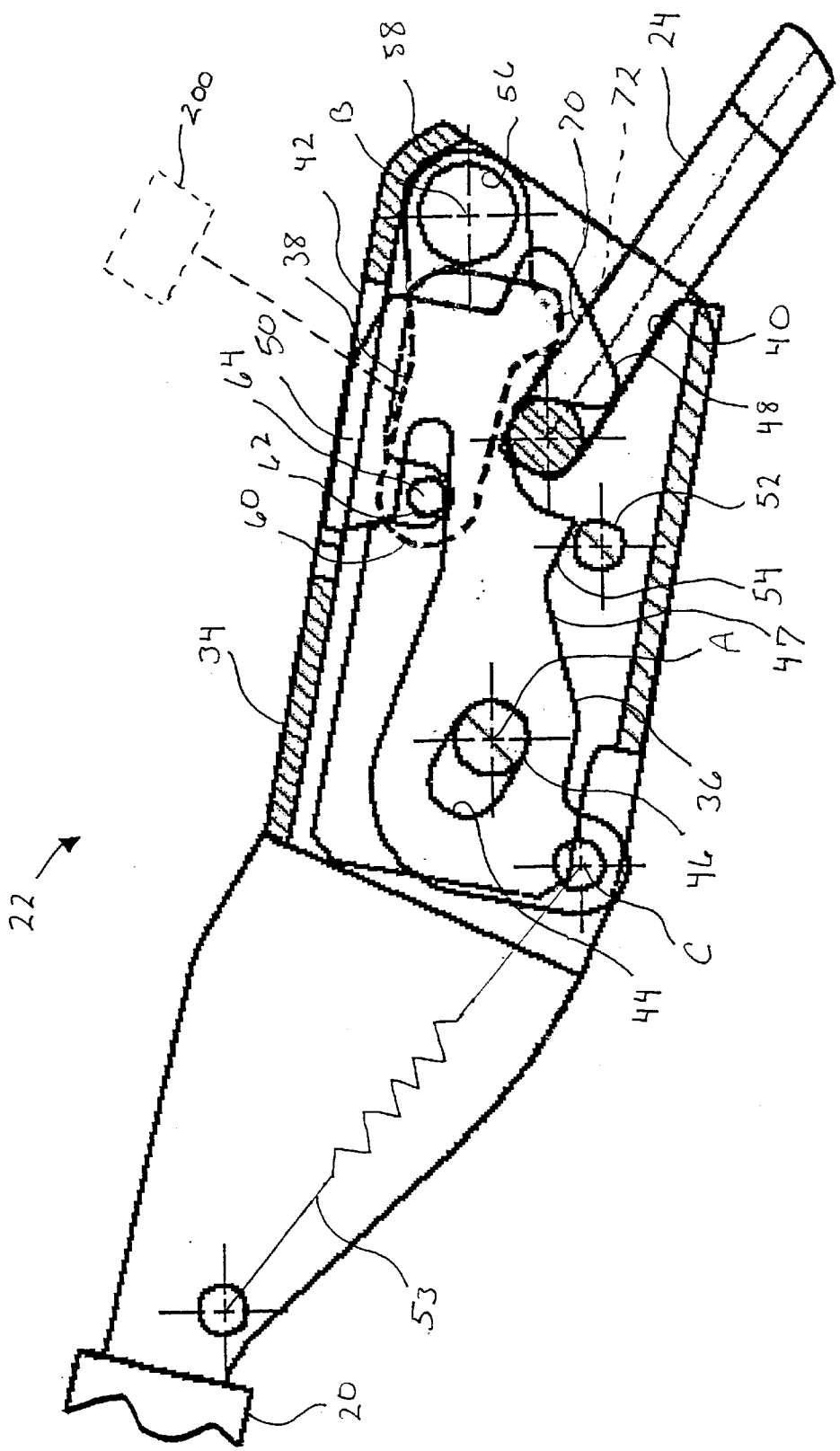
FIG. 3 is an enlarged cross-sectional view of the latch assembly shown in FIGS. 1 and 2 with the hook member in a first position.

Referring now to FIGS. 2 and 3, there is illustrated one of the pair of latch assemblies 22. The latch assembly 22 generally includes a housing 34, a hook member 36 and a release lever 38. The latch assembly 22 is generally operable between a latched position (FIGS. 2 and 3), an unlatched position (FIGS. 4 and 5), and a locked position (FIGS. 6 and 7), as will be described in detail below. As illustrated, one of the anchoring wires 24 is engaged by the hook member 36. The latch assembly 22 is in a latched position, such that the vehicle component 20 is secured to the anchoring wire 24. A portion of the U-shaped portion of the anchoring wire 24 extends outside of the housing 34 when the anchoring wire 24 is engaged by the hook member 36, although such is not required. It will be appreciated that the entire U-shaped portion of the anchoring wire 24 or any portion thereof may extend within the housing 34 when the anchoring wire 24 is engaged by the hook member 36.

The housing 34 is operatively connected to the vehicle component 20, such as by integral forming to the vehicle component 20 or the support portion 28, welding to the vehicle component 20 or the support portion 28, or any other suitable connection means. The housing 34 protects at least a portion of the hook member 36 and the release lever 38 from external interference with the motion of the hook member 36 and the release lever 38, as will be described below. The housing 34 has a slot 40 for receiving the anchoring wire 24 as illustrated. The housing has an opening 42, the function of which will be described below.

The hook member 36 is movably mounted relative to the housing 34. The hook member 36 may be pivotably mounted to the housing 34 about a pivot axis A, although such is not required. The hook member 36 may include a slot 44 for receiving a pivot pin 46, although such is not required. The pivot pin 46 may be fixed to the housing 34. The hook member 36 includes a body portion 47, a first flange 48, and a second flange 50. As illustrated in FIG. 3, the hook member 36 is in a first position relative to the housing 34. When the hook member 36 is in the first position, the first flange 48 may extend into the slot 40 of the housing 34. When the hook member 36 is in the first position, the hook member 36 may then rotate about the pivot axis A, such that the second flange 50 enters the opening 42 in the housing 34. When the hook member 36 rotates such that the second flange 50 enters the opening 42, the first flange 48 is correspondingly rotated such that the first flange 48 no longer extends into the slot 40. The anchoring wire 24 may then enter the slot 40. The hook member 36 may then rotate back to the first position such that the first flange 48 engages the anchoring wire 24 to retain the latching assembly 22 to the anchoring wire 24. The hook member 36 may be mounted within the housing 34 such that rotation of the hook member 36 about the pivot axis A is limited by the housing 34. A stop 52 may be provided to limit the rotation of the hook member 36, although such is not required. In a preferred embodiment, the hook member 36 may be spring biased so that the hook member 36 is urged toward the stop 52, as indicated schematically by the spring 53 about an axis C. The hook member 36 may include a third flange 54 for engaging the stop 52.

The release lever 38 is movably mounted relative to the housing 34. The release lever 38 may be pivotably mounted to the housing 34 about a pivot axis B, although such is not required. The release lever 38 may include an opening 56 for receiving a pivot pin 58 about the pivot axis B, although such is not required. The pivot pin 58 may be fixed to the housing 34 and disposed within the opening 56 of the release lever 38. The release lever 38 may include a flange portion 60. The flange portion 60 may have an opening 62 therein to receive a pin 64. The pin 64 is connected to the flange portion 60 of the release lever 38. The pin 64 is disposed between the body portion 47 of the hook member 36 and the second flange 50 of the hook member 36 when the hook member 36 is in the first position. The pin 64 is independent of the housing 34. The rotation of the release lever 38 about the pivot axis B is limited by the movement of the hook member 36. Therefore, if either the hook member 36 or the release lever 38 are raised or lowered through the opening 42 in the housing 34, the other is also raised or lowered correspondingly. A portion of the release lever 38 may extend outside of the housing 34 to manually move the release lever 38. Optionally, a handle (shown schematically at 200 in FIG. 3) for manually moving the release lever 38 may be attached to the release lever 38 or the pin 64 that extends outside of the housing 34.

Figure 4:
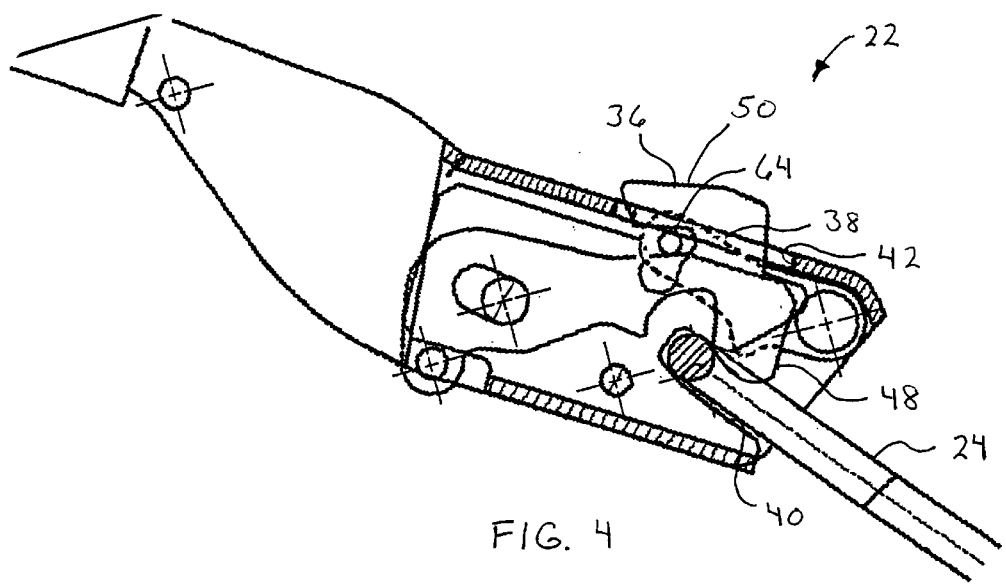
FIG. 4 is an enlarged cross-sectional view of the latch assembly shown in FIGS. 1, 2 and 3 with the release lever manually raised to release the anchoring wire.

Referring now to FIG. 4, there is illustrated the latch assembly 22 in the unlatched position with the release lever 38 manually raised to release the anchoring wire 24. The release lever 38 has been raised away from the anchoring wire 24, and the pin 64 and the hook member 36 have correspondingly also raised away from the anchoring wire 24 relative to the housing 34, because of the connection therebetween. If the hook member 36 is spring biased by the spring 53, this spring bias force is overcome to raise the hook member 36 and the release lever 38. The hook member 36 has been raised from the first position relative to the housing 34 such that the second flange 50 extends through the opening 42 in the housing 34, and the first flange 48 is raised clear of the slot 40 in the housing 34. A portion of the release lever 38 may also enter the opening 42 when the hook member 36 is raised. The anchoring wire 24 is therefore free to slide through the slot 40 as the vehicle component 20 is removed from the anchoring wire 24. Thus, the hook member 36 is in an unlatched position relative to the housing 34, where the latch assembly 22 may disengage the anchoring wire 24. The shape, arrangement and interaction between the release lever 38, hook member 36 and the housing 34 of the latch assembly 22 lessen the play between the components of the latch assembly 22, and therefore reduce the vibration and noise generally associated with a latch assembly.

Figure 5:
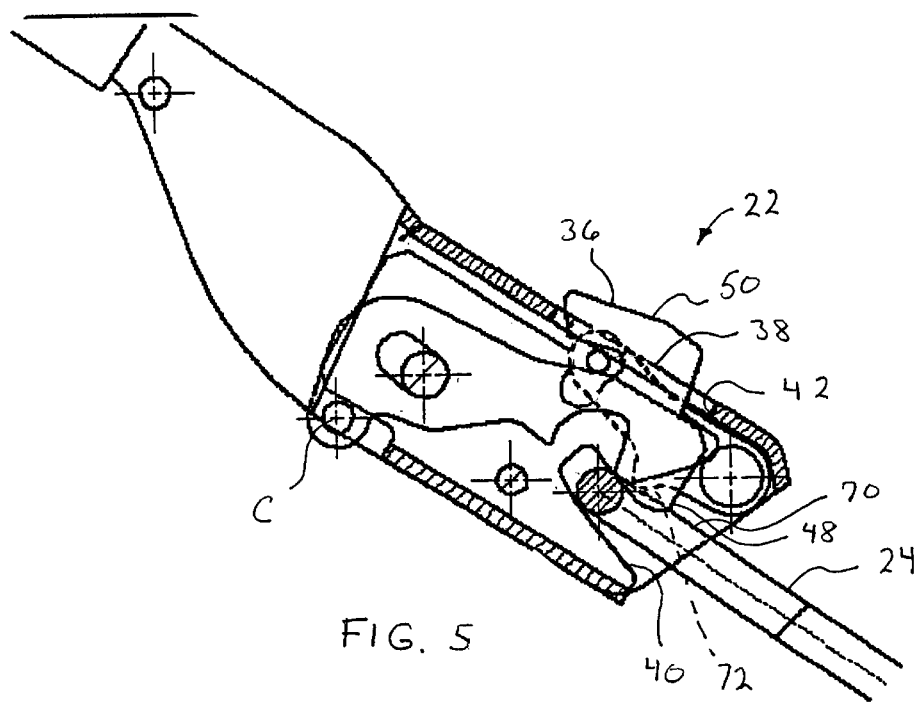
FIG. 5 is an enlarged cross-sectional view of the latch assembly shown in FIGS. 1 through 4 with the latch housing rotated upward to release the anchoring wire.

Referring now to FIG. 5, there is illustrated the latch assembly 22 in another unlatched position with the vehicle component 20 and the latch housing 34 rotated upward relative to the vehicle 10 and the anchoring wire 24. The vehicle component 20 is essentially pivoted about the anchoring wire 24 such that the front portion of the component 22 is lifted upward. Prior to rotating the vehicle component 20 and the latch housing 34 about the anchoring wire 24, the hook member 36 was in the first position relative to the housing 34, such as shown in FIG. 2. An extension flange 72 of the release lever 38 is positioned above a portion 70 of the anchoring wire 24. As the latch housing 34 is rotated clockwise (upward movement of the vehicle component 20), the portion 70 of the anchoring wire 24 pushes against the extension flange 72 of the release lever 38 causing the release lever 38 to rotate clockwise about the pivot axis B. Rotation of the release lever 38 causes the hook member 36 to lift upward (rotate counterclockwise) due to movement of the pin 64. Sufficient rotational movement of the release lever 38 and the pin 64 causes the first flange 48 to be positioned above the slot 40, thereby permitting the anchoring wire 24 to be withdrawn from the slot 40. Thus, the hook member 36 is in the unlatched position relative to the housing 34, where the latch assembly 22 may disengage the anchoring wire 24. In a preferred embodiment, the first flange 48 of the hook member 36 clears the slot 40 when the vehicle component 20 is pivoted at an angle between about 15° and about 30° relative to the anchoring wire 24 from a position with the vehicle component 20 at rest against the seat cushion 16. Also, it has been found that preferably the first flange 48 of the hook member 36 clears the slot 40 when the vehicle component 20 is pivoted at an angle approximately 22° relative to the anchoring wire 24 from a position with the vehicle component 20 at rest against the seat cushion 16. Note that during this unlatching, the second flange 50 of the hook member 36 is free to extend through the opening 42.

Figure 6:
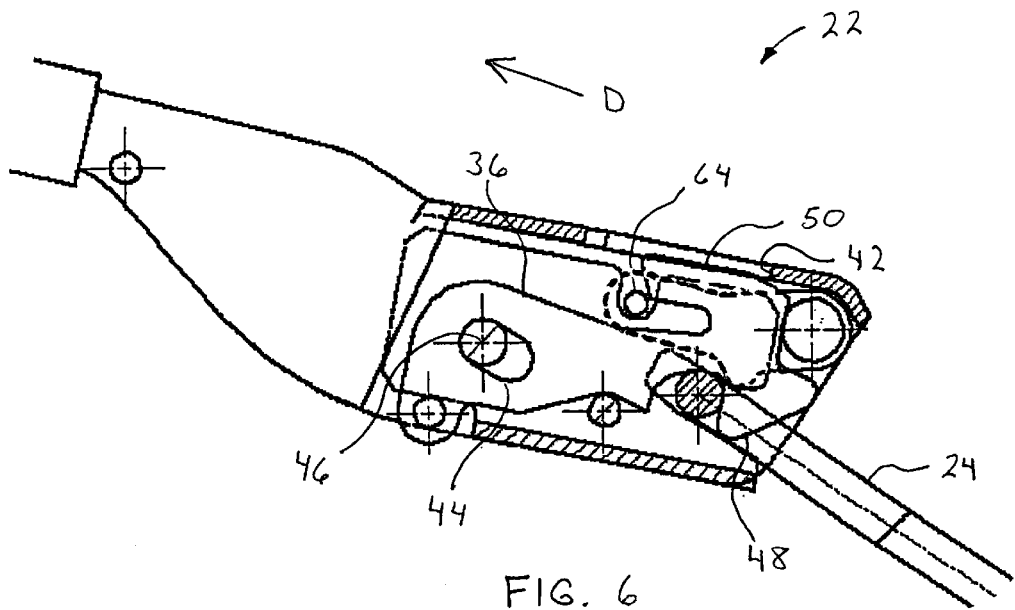
FIG. 6 is an enlarged cross-sectional view of the latch assembly shown in FIGS. 1 through 5 with the hook member in a second position.

In FIG. 6, the latch assembly 22 is shown in a locked position with the hook member 36 in a second position relative to the housing 34. This position may be caused by forward movement of the component 22 relative to the anchoring wire 24, such as during high deceleration of the vehicle 10. The housing 34 including the pivot pin 46, the release lever 38, and pin 64 have moved forward and slightly upward in a direction D relative to the vehicle 10 and the anchoring wire 24. Therefore, the pivot pin 46 has now slid forward through the slot 44 in the hook member 36. The second flange 50 of the hook member 36 is no longer aligned with the opening 42 in the housing 34 such that the second flange 50 may enter the opening 42. Therefore, the second flange 50 is trapped within the housing 34, and the hook member 36 cannot be raised such that the first flange 48 of the hook member 36 is clear of the slot 40. Thus, the hook member 36 cannot move to the unlatched position relative to the housing 34 from the second position. This is desirable because the housing 34 could be moved in the direction D due to the movement of the vehicle component 20 caused by inertia as the vehicle 10 decelerates. The vehicle 10 might decelerate creating this inertia due to an impact or sudden braking situation. In this situation, it would not be desirable for the vehicle component 20 to move to an unlatched position. It will be appreciated that in such a deceleration situation, the anchoring wire 24 may deform such that the U-shaped hook portion of the anchoring wire 24 is bent, angled, or moved upward relative to the portion 26 of the vehicle 10. If the anchoring wire 24 deform in this manner, the latch assembly 22 continues to remain latched to the anchoring wire 24. It will also be appreciated that the anchoring wire 24 may not only be fixedly attached to the portion 26 of the vehicle 10, but may also be pivotably mounted such that the U-shaped hook portion of the anchoring wire 24 is free to pivot vertically relative to the portion 26 of the vehicle 10. Again, if the anchoring wire 24 pivots upwardly, the latch assembly 22 continues to remain latched to the anchoring wire 24.

For the latch assembly 22 to return to normal latching and unlatching operation, the hook member 36 is returned to the first position relative to the housing 34. This may be accomplished by the force of the spring 53 or by pushing the vehicle component 20 toward the anchoring wire 24.

Figure 7:
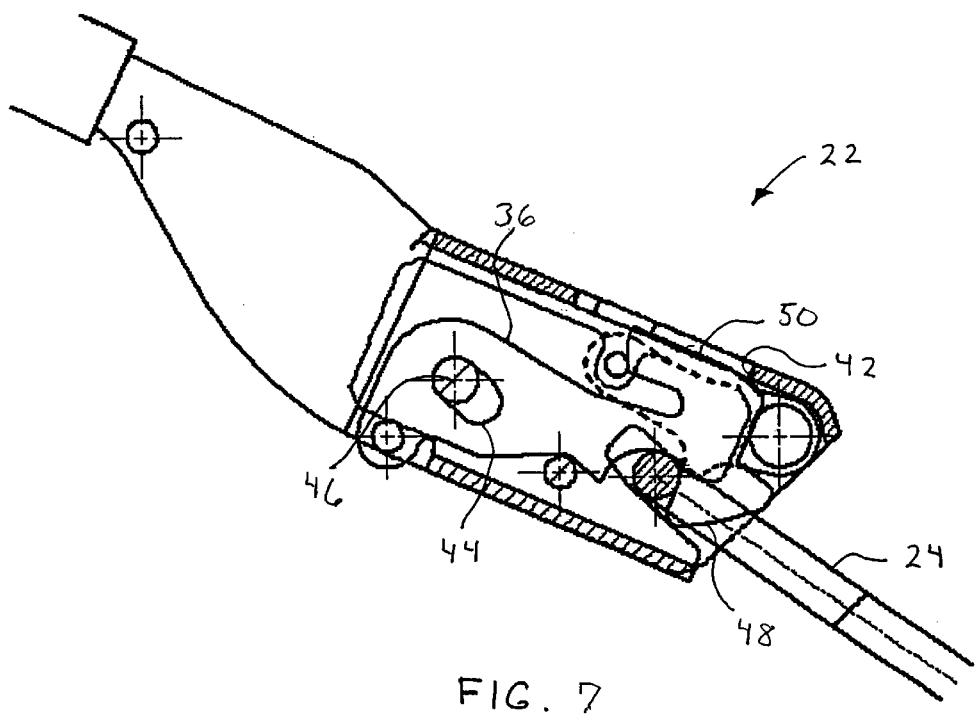
FIG. 7 is an enlarged cross-sectional view of the latch assembly shown in FIGS. 1 through 6 with the hook member in a second position and the housing rotated upward without release of the anchoring wire.

In FIG. 7, the latch assembly 22 is shown with the hook member 36 in the second position and the housing 34 rotated upward about the anchoring wire 24. The housing 34 has been rotated about the anchoring wire 24 in a manner similar to that illustrated in FIG. 5. However, in contrast to the housing 34 and the hook member 36 as illustrated in FIG. 5, the second flange 50 of the hook member 36 in FIG. 7 cannot enter the opening 42, because the second flange 50 is no longer aligned with the opening 42. The second flange 50 is prevented from rotational movement into the opening 42 by the housing 34. Therefore, when the hook member 36 is in the second position relative to the housing 34, the hook member 36 cannot be moved to the unlatched position by rotating the latch assembly 22 and housing 34 upward about the anchoring wire 24. As described above, moving the hook member 36 from the second position to the unlatched position is undesirable because the hook member 36 may be in the second position due to an impact or sudden braking situation of the vehicle 10. The hook member 36 must be returned to the first position to unlatch the anchoring wire 24 from the latch assembly 22.

Referring now to FIG. 8, there is illustrated an embodiment of the vehicle component 20, in the form of a travel assistant system, including the support portion 28. As illustrated, the support portion 28 is separate and detached from the vehicle component 20. The vehicle component 20 may be removably secured to the support portion 28 by any conventional latching means, such as plurality of slots 100 formed in the support portion 28 and a plurality of corresponding tab portions (not shown) extending from a bottom surface 102 of the vehicle component 20. The latch assemblies 22 are secured directly to the support portion 28 of the vehicle component 20 for removably securing the support portion 28 to the anchoring wires 24 of the vehicle 10. The support portion 28 may be connected to a power supply (not shown) of the vehicle 10. The support portion 28 may include a power supply outlet 105 to supply power to a power supply connection (not shown) of the vehicle component 20 when the vehicle component is removably secured to the support portion 28 to provide power to various electrical components of the vehicle component 20 as will be described below. Use of separate components 20 and support portions 28 enables a manufacturer to make multiple support portions 28 configured for attachment to particular vehicles, while permitting different styles of components 20 having different features to be mounted thereon.

The vehicle component 20 may include at least one storage compartment 104. An armrest lid 106 may cover one or more of the storage compartments 104. The lid 106 may be hinged to the vehicle component 20 for rotational movement. The vehicle component 20 may also include one or more trays 108. Each of the trays 108 may be pivotably mounted to the vehicle component 20 so that each of the trays 108 may be rotated into an open position, as shown, and a closed position, not shown, wherein each of the trays 108 is stored within the storage compartment 104 or a slot (not shown) in the vehicle component 20. The vehicle component 20 may also include a platform 110 for supporting an electronic device 111, such as a DVD player or portable computer. The platform 110 may be pivotable or retractably mounted to the vehicle component 20 such that the platform 110 may be moved to an extended position, as shown in FIG. 8, and a retracted position, as shown in FIG. 1, wherein the platform 110 is stored within or on the vehicle component 20. The platform 110 may include a pivoting retainer 112 for trapping and securing the device 111 to the platform 110. The vehicle component 20 may include a movable beverage holder 114 for holding beverages in a conventional manner.

The vehicle component 20 including the support portion 28 may also include various electrical components. As illustrated, the support portion 28 includes a light 116. However, it will be appreciated that the light 116 may be located on any portion of the vehicle component 20. The vehicle component 20 may include one or more power outlets 118. The power outlet 118 may be a DC power outlet, such as a conventional car cigarette-lighter style outlet, or any conventional AC power outlet. The vehicle component 20 may also include a DC to AC power converter if an AC power outlet is provided. The vehicle component 20 may contain an audio-visual system 120. The audio-visual system 120 may be operable from a control panel 122 within the vehicle component 20 and additionally, or alternatively from the audio-visual control unit (not shown) of the vehicle 10. The control panel 122 may also control the operation of various other electrical components within the vehicle 10 and the vehicle component 20, although such is not required.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A latch assembly for securing an auxiliary vehicle component to an anchoring member mounted on the vehicle, said latch assembly comprising:
    a housing operatively connected to a vehicle component;
    a hook member movably mounted relative to said housing, said hook member including a hook portion for engaging the anchoring member to secure the vehicle component relative to the anchoring member, wherein said hook member is movable between first and second positions,
    wherein said hook member in said first position is permitted to move to an unlatched position to disengage the anchoring member,
    and wherein said hook member in said second position is prevented from moving to said unlatched position.

2. The assembly according to claim 1, wherein the vehicle component is a console defining a storage compartment.

3. The assembly according to claim 1, further including a release lever movably mounted relative to said housing, said release lever operable to induce movement in said hook member.

4. The assembly according to claim 3, wherein said release lever is further operable to limit movement in said hook member.

5. The assembly according to claim 3, wherein said release lever further comprises a handle for manually moving said release lever.

6. The assembly according to claim 3, wherein said release lever is pivotably mounted relative to said housing.

7. The assembly according to claim 1, wherein said hook member is pivotably mounted relative to said housing.

8. The assembly according to claim 1, wherein an opening is provided in said housing through which said hook member extends thereby permitting said hook member to move to one of said first position and said unlatched position.

9. The assembly according to claim 8, wherein said hook member is pivotably mounted relative to said housing for movement about a pivot axis.

10. The assembly according to claim 9, wherein said hook member is slideably moveable between the first position and the second position thereby altering the pivot axis relative to said housing.

11. The assembly according to claim 10, wherein said hook member further includes a slot, said hook member is pivotably mounted about a pivot pin disposed within said slot, such that said slot is operable to facilitate slideable movement between the first position and the second position.

12. The assembly according to claim 1, wherein said hook member is moved to the second position by the movement of the vehicle component caused by inertia as the vehicle decelerates.

13. The assembly according to claim 1, wherein said hook member is slideably moveable between the first position and the second position.

14. The assembly according to claim 1, wherein said hook member is spring biased towards the first position.

15. The assembly according to claim 14, wherein said hook member is moved to the second position by the movement of the vehicle component caused by inertia as the vehicle decelerates.

16. The assembly according to claim 1, wherein said hook member is movable to said unlatched position from said first position when said housing is pivoted at an angle approximately 15° or greater relative to the anchoring member from a position wherein the vehicle component is at rest against a portion of the vehicle.

17. The assembly according to claim 1, wherein said hook member is prevented from moving from said second position to said unlatched position by interference of said housing.

18. The assembly according to claim 1, wherein the anchoring member includes a U-shaped loop portion and a portion of said U-shaped loop portion of the anchoring member is outside of said housing when the anchoring member is engaged by said hook member.

19. A latch assembly for securing a vehicle component to an anchoring member mounted on the vehicle, said latch assembly comprising:
    a housing attached to the vehicle component;
    a hook member movably mounted relative to said housing, said hook member including a hook portion for engaging the anchoring member to secure the vehicle component relative to the anchoring member, wherein said hook member is movable between first and second positions relative to said housing,
    wherein when said hook member is in said first position, said hook member is permitted to move to an unlatched position to disengage the anchoring member,
    wherein when said hook member is in said second position, said hook member is prevented from moving to said unlatched position by interference from said housing.

* * * * *

UNITED STATES PATENT AND TRADEMARK OFFICE
CERTIFICATE OF CORRECTION

PATENT NO. : 6,736,438 B1
DATED : May 18, 2004
INVENTOR(S) : Stanislaw Andrzej Wieclawski It is certified that error appears in the above-identified patent and that said Letters Patent is hereby corrected as shown below:

Column 7,
Line 27, delete "the" and insert -- a --;
Line 29, delete the second "a" and insert -- the --.

Signed and Sealed this

Sixth Day of July, 2004

JON W. DUDAS
*Acting Director of the United States Patent and Trademark Office*